INVENTOR
YANNICK MARSAULT
BY
ATTORNEYS

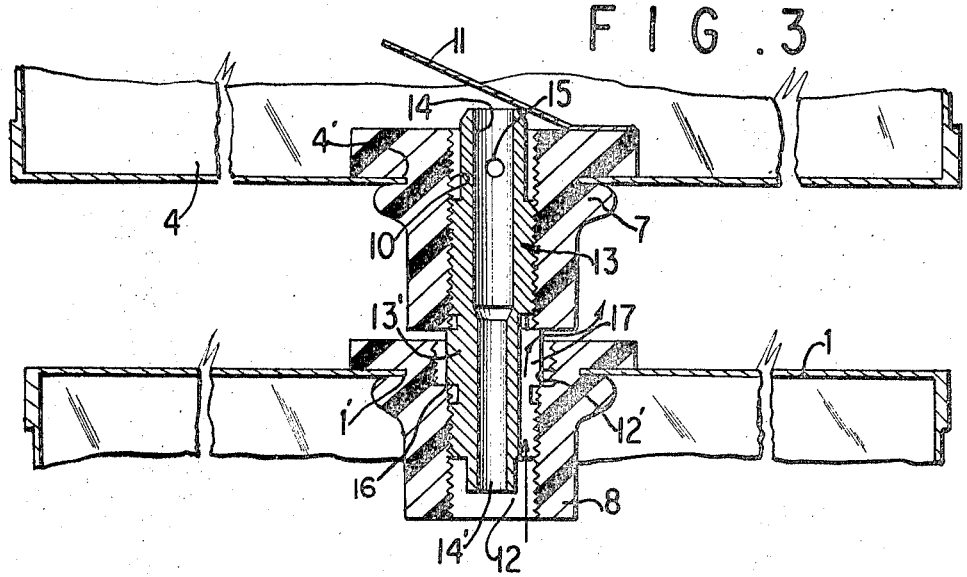
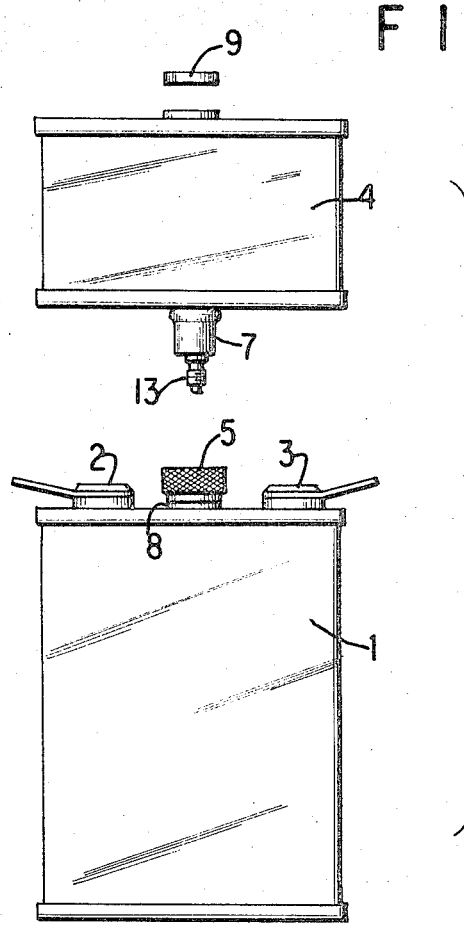

United States Patent Office 3,575,726
Patented Apr. 20, 1971

3,575,726
PRIMABLE ELECTROCHEMICAL GENERATOR AND ELECTROLYTE RESERVOIR STRUCTURE
Yannick Marsault, Poitiers, France, assignor to Societe des Accumulateurs Fixes et de Traction (Societe Anonyme), Romainville, France
Filed Sept. 11, 1969, Ser. No. 857,112
Claims priority, application France, Sept. 11, 1968, 165,868
Int. Cl. H01m 21/00
U.S. Cl. 136—114
12 Claims

ABSTRACT OF THE DISCLOSURE

A primable electrochemical generator and electrolyte reservoir structure wherein electrolyte stored separately in a reservoir may be admitted into the container of a primable electrode separator unit at the desired time of use, so that said unit normally in the charged but dry state only then becomes primed for use as a power source. The reservoir has an orifice normally closed by a frangible partition which prevents flow of electrolyte to the unit until the partition is pierced or ruptured so that flow into the dry unit via a filling aperture can then occur. A first nozzle comprising a centrally tapped duct is provided in the filling aperture and one end of a tubular element is screwed into this duct. The other end of the tubular element is threadedly engaged in fluid tight manner in the duct of a second nozzle mounted in the orifice of the reservoir. A safety ring surrounding the tubular element and disposed between the adjacent terminal faces of the nozzles and must be removed at the time of priming. This ring prevents the end of said tubular element closest to the partition from engaging or piercing it. To effect priming action, the reservoir and its nozzle are unscrewed from the tubular element and the safety ring removed. Then the nozzle is remounted on the tubular element and screwed onto the latter, the addition space occasioned by removal of the spacing ring then permitting a sharpened end of the tubular element to move into piercing or rupturing contact with the partition thereby permitting flow of electrolyte via the tubular element from the reservoir into the unit. Any air within the unit is vented therefrom as electrolyte flows into it via one or more external grooves provided in the tubular element which are so located as to preclude formation of bubbles. Filling time is controlled by appropriate dimensioning of the tubular element and the grooves.

BRIEF SUMMARY OF INVENTION

The invention relates to an improved priming device for electrochemical generators of the type in which an electrolyte reservoir is provided with an orifice normally closed by an appropriate partition which must be apertured as by being ruptured or pierced at the desired instant of priming so as to enable the electrolyte to flow from the reservoir into the generator through a filling aperture of the latter provided for this purpose.

It is known that in a primable generator the electrode-separator unit is kept in the charged and dry state in a container and that the electrolyte is introduced into the container, i.e. the generator is primed, only when it is desired to discharge it.

Consequently, as long as the electrochemical generator is not primed, substantially no local action occurs; more patricularly, the electrodes cannot be chemically attacked by the electrolyte. These generators can thus be stored "ready for operation" without deterioration for a very long time, which would not otherwise be possible.

In order to transfer the electrolyte contained in a reservoir into the container, a so-called priming device is employed.

One object of the present invention is to provide a novel priming device which is very simple and therefore of low cost, and which is easy to construct and to employ, while ensuring complete reliability of operation.

The invention provides an improved priming device for electrochemical generators of the type in which the electrolyte reservoir has an orifice normally closed by an appropriate frangible partition, which must be apertured by being ruptured or pierced at the desired time of priming, and thus enable the electrolyte to flow from the reservoir into the generator through a filling aperture of the latter provided for this purpose, characterised in that the filling aperture of the generator is provided with a first nozzle comprising a centrally tapped duct into which one end of a tubular element is screwed, the other end of the element is engaged in fluid-tight manner in the duct of a second nozzle provided in the orifice of the reservoir, a so-called spacer or safety ring, surrounding the said tubular element, being disposed between the adjoining terminal faces of the two nozzles in such a manner that end of the tubular element which is closest to the orifice of the reservoir cannot be moved into rupturing or piercing contact with the aforesaid partition while the safety ring is so disposed.

In accordance with one embodiment of the invention, the second nozzle provided in the orifice of the reservoir has a tapped central duct, that end of the tubular element which is engaged in the said nozzle being at least partially externally threaded so that it may be screwed into the said nozzle.

The intermediate or central portion of the tubular element is advantageously unthreaded and advantageously has an external diameter at least equal to the external diameter of the screwthreads so as to limit the extent of screwing of the element into the two nozzles.

Further features and objects of the invention will become apparent from the following description and from the accompanying drawings in which:

FIG. 3 is a view similar to that of FIG. 2 showing the condition of the priming device during priming; and FIG. 4 is a view similar to that of FIG. 1, after priming has been completed.

Figure 1:
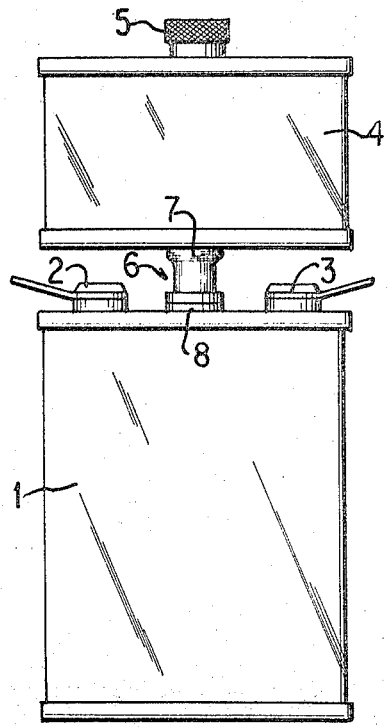
FIG. 1 is an elevational view of the assembly comprising the electrolyte reservoir, the priming device according to the invention and the electrochemical generator in their condition prior to priming.

In these figures, the container or tank of the electrochemical generator containing the active elements is denoted by the reference numeral 1, while the output terminals of the generator are denoted by numerals 2 and 3. Before priming, the container 1 is connected by the priming device to an electrolyte reservoir 4 which latter is closed in fluid-tight manner as by a knurled stopper 5, optionally with the interposition of a washer 5'. The reservoir 4 contains the quantity of electrolyte necessary for the priming of the generator in container 1.

Figure 2:
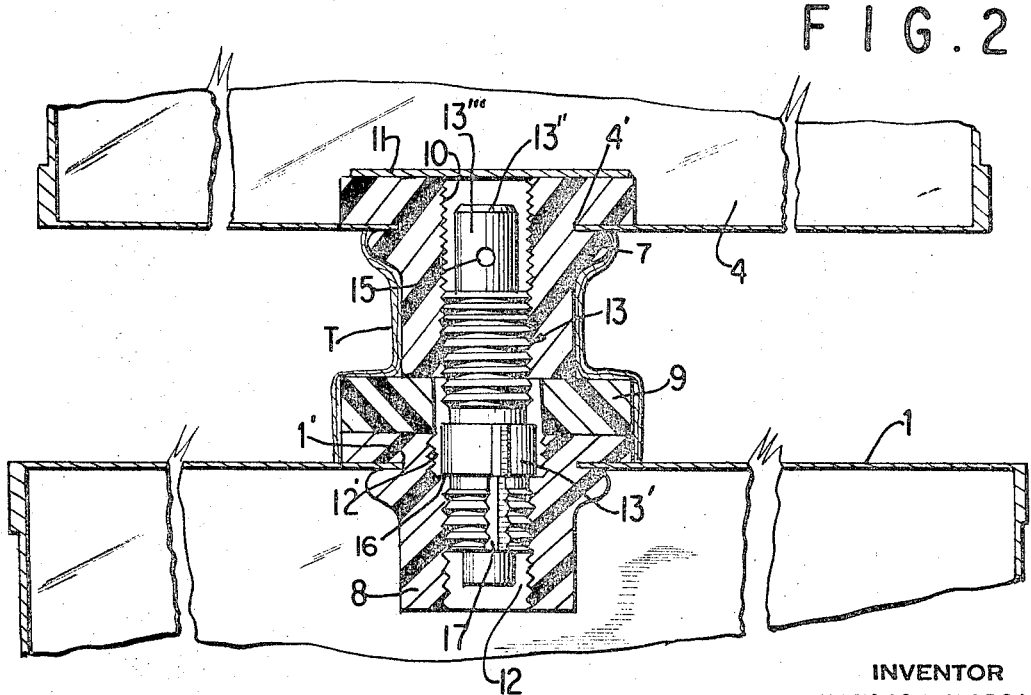
FIG. 2 is a view, partly in section, of one form of construction of the priming device embodying the invention in its condition prior to priming.

Referring to FIG. 2, it will be seen that the priming device 6 is constructed as follows:

The filling orifice 1' of the generator has a nozzle 8 mounted therein, said nozzle having a tapped central duct 12 into which one end of a screwthreaded tubular element 13 is screwed. The orifice 4' of the reservoir 4 also has mounted therein a nozzle 7 having a tapped central duct 10 into which the other end of the tubular element 13 is screwed. A ring 9, called the safety ring, preferably of resilient material, is mounted on the tubular element 13 in such a manner that the terminal faces of the nozzles 7 and 8 bear and press against the said ring, whereby the container 1 is sealed.

The duct 12 of nozzle 8 comprises a widened portion 12'.

The central or intermediate portion 13' of the tubular element 13 is not threaded and its external diameter is preferably equal to the external diameter of the screwthreaded portions of said element 13 so that the extent to which the element 13 may enter the nozzle 8 is limited.

The reference numeral 11 denotes a closure member or partition which covers the inner end of duct 10 and is adapted to be torn off or ruptured or pierced and which is applied at the inner end of the nozzle 7. This partition 11 thus normally closes the orifice 4' of the electrolyte reservoir 4.

As may be seen from FIG. 2, the ring 9 is of sufficient thickness to limit the extent of screwing of the nozzle 7 onto the element 13, so that the upper end of the latter cannot reach or engage the closure member or partition 11.

When the said ring 9 is of resilient nature, it may usefully serve the further function of a packing or sealing ring in the compressed state in order to protect the active components of the battery in container 1 from the action of air or moisture.

The unthreaded intermediate or central portion 13' of the tubular element 13 also provides a limitation to the screwing movement of the nozzle 7 on element 13 when the ring 9 has been removed. For additional safety, optionally, the members 7, 8 and 9, all may be of equal external diameter. They may be surrounded by one or more turns of an optionally water-repellent adhesive tape T to insure complete fluid-tightness and to prevent involuntary or accidental loosening or separation of the reservoir and container.

In order to prime the generator, a user must perform the following successive operations:

Remove the adhesive tape T, if any, surrounding members 7, 8 and 9;

Unscrew the reservoir 4 from element 13 so as to remove the safety ring 9 from the latter;

Completely rescrew the reservoir onto element 13, i.e. until the outer end of nozzle 7 abuts the shoulder 16 of portion 13'.

As is apparent from FIG. 3, while the reservoir 4 is moving towards the container in such screwing operation, the member 13 moves longitudinally through duct 10 and pierces or ruptures the closure member 11, thus placing the reservoir 4 into direct communication with the container 1 through the central duct 14 of the tubular element 13.

In order that this communication may be appropriately afforded, the element 13 must penetrate sufficiently into the reservoir and pierce or rupture partition 11. To this purpose its end may be bevelled or sharpened at 13". In addition the terminal portion 13''' of the member 13 situated closest to the reservoir 4 is preferably unthreaded and its external diameter is preferably slightly smaller than the internal diameter of the duct 10 of the nozzle 7. The wall of this terminal portion 13''' is also formed with at least one lateral perforation 15 so as to permit substantially complete flow of the electrolyte from reservoir 4 to the container 1.

The operator or user must thereafter unscrew and remove the stopper 5 which closes the reservoir 4, so as to expose the surface of the electrolyte in reservoir 4 to atmospheric pressure and to enable the electrolyte to flow into the container 1 as it expels the air therefrom through at least one longitudinal groove 17 provided for this purpose in the screwthreaded portion of the element 13 that is screwed into the duct 12 of nozzle 8.

The terminal portion of the element 13 which is closest to the filling orifice 1' is unthreaded and its external diameter is smaller than the diameter of the screwthreaded portion of said duct 12 situated above it. Consequently, that end of the grove 17 through which the gases escape is situated slightly above the point from which the electrolyte flows into duct 12. This makes it possible to prevent the formation of bubbles which would interfere with the filling of the generator, by preventing the air from leaving rapidly and also preventing disturbing interactions of a hydrodynamic nature between the flow of liquid into the container and the flow of air out of the container.

The filling time is directly related to the time taken by the air to leave the generator. Consequently, it decreases when the space between the internal wall of the duct 12 and the external wall of the unthreaded terminal portion of the element 13 increases. It also decreases when the number and/or the dimensions of the grooves, such as 17, are greater. Consequently, it is possible by varying these various dimensions to adjust the time of flow of the electrolyte and hence to adjust the priming speed. As illustrated, the duct 14 of element 13 may be narrowed at its lower region 14' in order to increase the speed of flow and thus to impart a higher pressure to the electrolyte entering the generator in container 1 when this electrolyte leaves the narrowed portion 14' of the duct 14.

When the electrolyte has been completely discharged, from the reservoir 4 into container 1, the user must then:

unscrew the reservoir 4 from element 13;

unscrew the element 13 from nozzle 8 if it has not come off together with the reservoir 4.

close or seal the nozzle 8 in fluid-tight manner as by screwing into its threaded portion 12' a stopper, for example the stopper 5, optionally with interposition of a washer 5'.

The generator is then primed and ready for operation, as is apparent from FIG. 4, in which the reference 4e denotes the empty reservoir.

A device according to the invention has been successfully employed for priming generators operating with non aqueous electrolyte, employing the lithium-copper sulfide couple. In this case, the reservoir contained as electrolyte a lithium perchlorate solution in a mixture of tetrahydrofuran and dimethoxyethane.

Of course, the functions of the reservoir and of the container are interchangeable and it would also be possible to provide two closure members or partitions, one in the container and one in the reservoir.

In a variant, the nozzle 7 could be simply slidably mounted onto the element 13 and not screwed thereto. In this case, it would be sufficient for priming to disengage nozzle 7, to remove the ring 9 and to re-mount the nozzle 7 on element 13 in order to rupture or piece the closure member or partition 11. An O-ring (not shown) could then be provided to ensure fluid-tightness between the element 13 and the nozzle 7.

The priming device according to the invention, in which a temporary mechanical connection is made between the container and the reservoir, prevents the latter from being involuntarily or accidentally separated from the container before the time of priming. It also enables the fluid-tight closure of the container to be effected before such priming.

At the time of priming, it affords communication between the reservoir and the container, thus permitting the transfer of electrolyte, while allowing the gas contained in the container to vent or escape to the outside environment.

The priming device, which in fact comprises the two nozzles, the tubular element and the safety ring, must be made of mechanically strong material which is chemically resistant to the expected conditions of operation; it will advantageously consist of light materials. Thus, the nozzles and the safety ring may be made of plastics such as polypropylene or polytetrafluoroethylene, and the tubular element of aluminium.

Of course, the invention is in no way limited to the embodiment described and illustrated, which has been referred to only by way of example. More particularly, details may be modified, certain arrangements may be changed and certain means may be replaced by equivalent means without departing from the scope of the invention.

What is claimed is:

1. A primable electrochemical generator and electrolyte reservoir structure comprising a container for the generator, rupturable means to prevent flow of electrolyte from said reservoir into said container until said generator is to be put into use, priming means for rupturing said rupturable means to permit flow of electrolyte from said reservoir into said container at the desired time of use of the generator, said reservoir having an outlet orifice, said rupturable means comprising a partition closing off said orifice, said container having a filling aperture, a first nozzle positioned in said aperture and having a duct, a second nozzle positioned in said orifice of said reservoir and having a duct, a tubular element removably mounted in and projecting into both said ducts of said nozzles to maintain said generator and reservoir together as a unit, removable safety means mounted externally of said tubular element and between facing ends of said nozzles to limit the extent of projection of such tubular element into said second-named duct and to prevent rupturing engagement of said element with said partition, said second nozzle first nozzle rupturable means, safety means, and tubular element being constructed and arranged such that said second nozzle is removable from said tubular element at the desired time of priming to permit removal of said safety means from said tubular element, and remountable thereafter on said element, the removal of said safety means then permitting movement together of the facing ends of said nozzles so that the tubular element moves through the duct of the second nozzle and moves toward the partition such that said element pierces and ruptures said partition thereby permitting flow of electrolyte via said tubular element from said reservoir into said container to prime said electrochemical generator.

2. A primable electrochemical generator and electrolyte reservoir structure according to claim 1 wherein the duct of said second-named nozzle is tapped and that portion of said tubular element removably mounted in such last-named duct is threaded externally for screwing into the latter-named nozzle.

3. A primable electrochemical generator and electrolyte reservoir structure according to claim 1 wherein the ducts of both of said nozzles are tapped and those portions of said tubular element removably mounted in said ducts are externally threaded for screwing into the respective ducts.

4. A primable electrochemical generator and electrolyte reservoir structure according to claim 3, wherein said tubular element has an external unthreaded portion intermediate its externally threaded portions of the same diameter as said threaded portions to provide limitation to the extent of screwing of respective threaded portions into respective tapped ducts of said nozzles.

5. A primable electrochemical generator and electrolyte reservoir structure according to claim 1 wherein opposite outer end portions of said tubular element are of smaller diameter than intermediate portions thereof.

6. A primable electrochemical generator and electrolyte reservoir structure according to claim 5, wherein said intermediate portions are externally threaded for a screw-threaded engagement into the respective ducts.

7. A primable electrochemical generator and electrolyte reservoir structure according to claim 1 wherein that end of the tubular element projecting into said second-named duct is sharpened to facilitate rupture and piercing of said partition upon engagement therewith.

8. A primable electrochemical generator and electrolyte reservoir structure according to claim 5 wherein one outer end portion of said tubular element has at least one lateral perforation to facilitate flow of electrolyte from the reservoir into the container.

9. A primable electrochemical generator and electrolyte reservoir structure according to claim 1 wherein that portion of the tubular element removably mounted in the duct of said first-named nozzle has an external groove for permitting discharge of air from the container during priming flow thereto of electrolyte from the reservoir.

10. A primable electrochemical generator and electrolyte reservoir structure according to claim 1 wherein said removable safety means comprises a compressible ring compressed normally between said facing ends of said nozzles.

11. A primable electrochemical generator and electrolyte reservoir structure according to claim 1 including means wrapped externally about said nozzles and being removable therefrom to prevent accidental separation of said reservoir and container prior to the desired time of priming of the generator.

12. A primable electrochemical generator and electrolyte reservoir structure according to claim 11, wherein the means wrapped around said nozzles is water-repellent adhesive tape.

References Cited

UNITED STATES PATENTS

| 2,847,494 | 8/1958 | Jeannin | 136—114 |
| 3,067,274 | 12/1962 | Heinsohn et al. | 136—90 |
| 3,177,098 | 4/1965 | Amiet et al. | 136—90 |
| 3,391,951 | 7/1968 | Miller | 137—68 |
| 3,424,181 | 1/1969 | Morse | 137—68 |
| 3,467,120 | 9/1969 | Hill et al. | 137—68 |
| 3,475,226 | 10/1969 | Fraioli | 136—162 |
| 3,482,258 | 12/1969 | Steen | 141—329 |

WINSTON A. DOUGLAS, Primary Examiner

C. F. LE FEVOUR, Assistant Examiner

U.S. Cl. X.R.

136—90, 162